Aug. 29, 1972   G. M. WALLER   3,687,647
METHOD OF FABRICATION OF ABRASIVE DEVICE
Filed Sept. 3, 1970   2 Sheets-Sheet 1
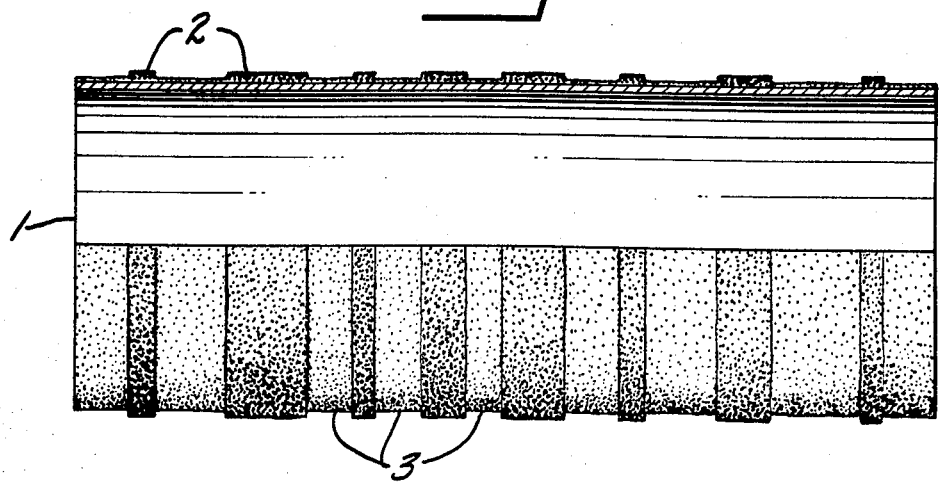
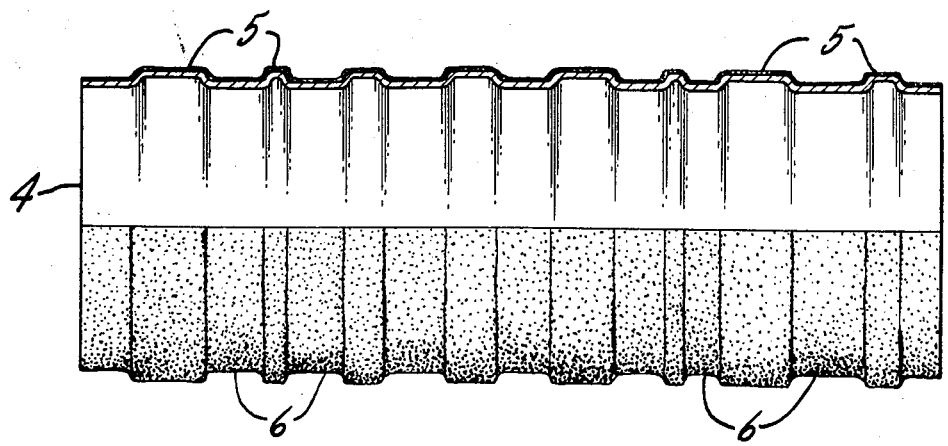
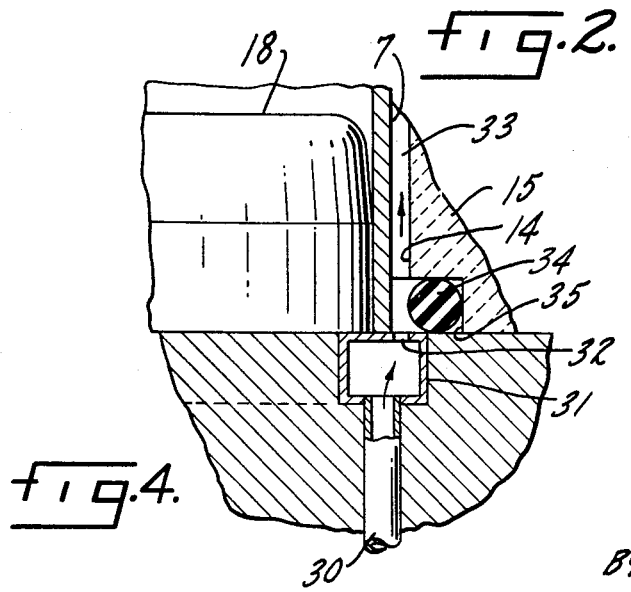
INVENTOR.
Gustav M. Waller
BY Parker, Carter & Markey
Attorneys.

Aug. 29, 1972    G. M. WALLER    3,687,647
METHOD OF FABRICATION OF ABRASIVE DEVICE
Filed Sept. 3, 1970    2 Sheets-Sheet 2

INVENTOR
Gustav M. Waller
BY Parker, Carter & Markey
Attorneys.

United States Patent Office 3,687,647
Patented Aug. 29, 1972

3,687,647
METHOD OF FABRICATION OF ABRASIVE DEVICE
Gustav M. Waller, Geneva, Ill., assignor to
Burgess-Norton Mfg. Co., Geneva, Ill.
Filed Sept. 3, 1970, Ser. No. 69,364
Int. Cl. B24d 3/02
U.S. Cl. 51—309                    3 Claims

ABSTRACT OF THE DISCLOSURE

A method of making an abrasive drum by applying a brazing coating and carbide grit to the exterior of the drum and then heating the drum in a furnace while the drum is positioned vertically. The drum is supported in the furnace on its end without the use of supporting fixtures. A controlled atmosphere is provided in the furnace during heating.

---

The invention relates to a method of making an abrasive device.

An object of the invention is a method of making an abrasive sleeve or drum in the simplest manner and particularly without special supporting or carrying parts for use during manufacture and during heat treatment. In general, the method involves the application to a metal sleeve, such as a steel sleeve, of copper paste and tungsten carbide grit and the brazing of the article by treating at suitable temperature in a vertical position and resting preferably on its own bottom without the necessity of using special supports or special fixtures. Other brazing material may be used.

Other objects will appear from time to time in the specification and claims.

The invention is illustrated more or less diagrammatically in the following drawings wherein:

FIG. 1 is an axial half section of one form of sleeve or drum,

FIG. 2 is an axial half section of a modified form of sleeve or drum,

FIG. 4 is an enlarged vertical cross-section illustrating a detail of the inlet which appears generally in FIG. 3.

Like numerals will be used to designate like parts throughout the following description of the drawings.

Figure 3:
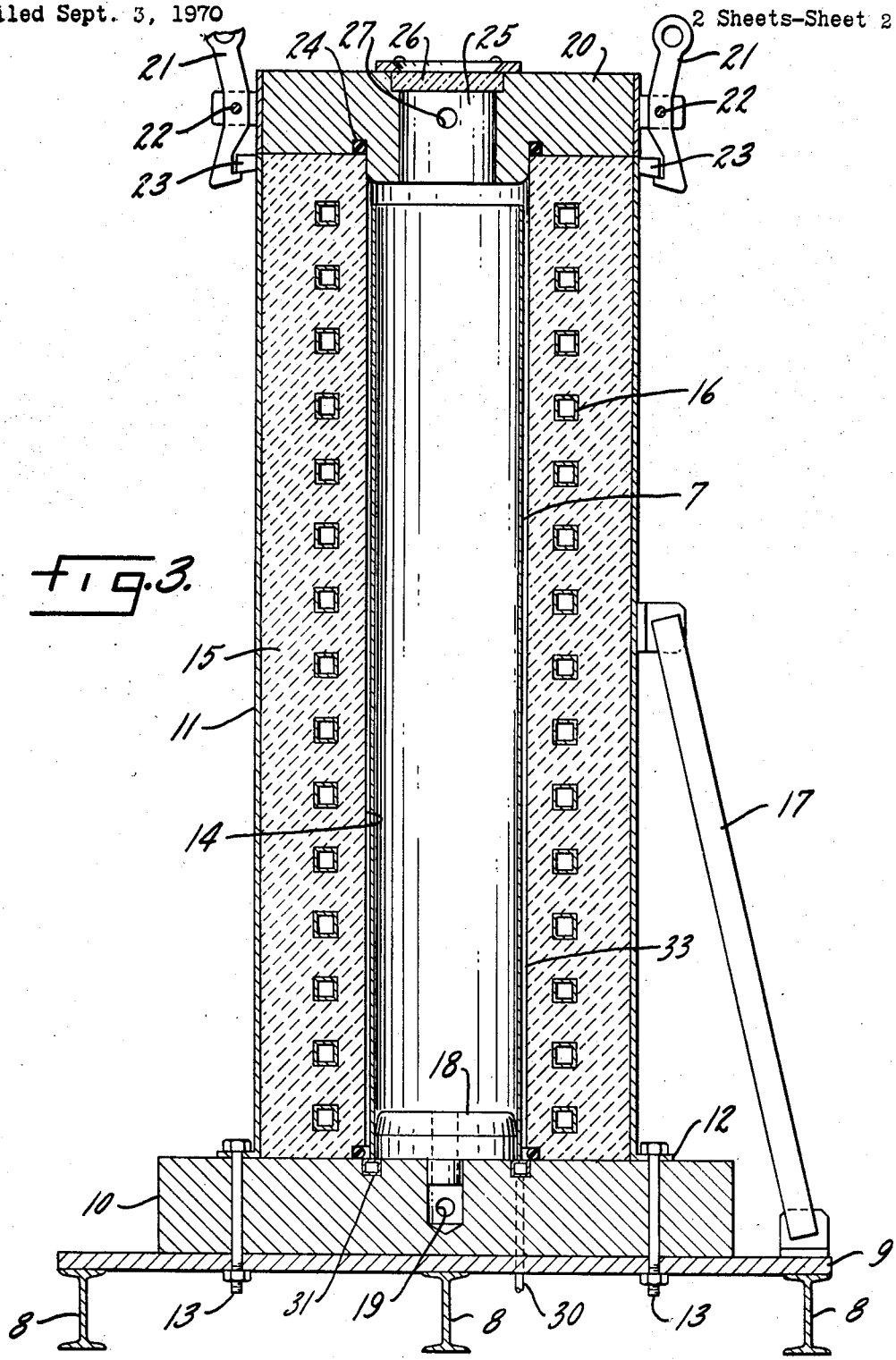
FIG. 3 is a vertical section illustrating one form of a suitable induction brazing furnace showing a sleeve in place.

As shown in FIG. 1, 1 is a rigid sleeve preferably formed of steel, although it may be formed of other metallic material. Abrasive grit such as tungsten carbide grit is brazed to its exterior and is arranged to produce a pattern suitable for scoring material which will be moved in relation to the sleeve and in contact with it and will be abraded by it.

To produce a pattern for scoring, the grit is applied in more than one degree of fineness. Thus there are bands 2 having relatively coarse grit and areas or bands 3 having relatively finer grit. The use of grit having a plurality of degrees of fineness will produce the pattern shown or any other pattern desired. Obviously, the coarse and fine grit may be arranged in different bands and different widths of bands depending upon the particular pattern desired.

When material, such as strips or sheets of wood, is moved relative to the sleeve and the latter is rotated, the surface of the strips or sheets will be given a pattern corresponding to that of the sleeve. The coarse grit will form deeper marks and the fine grit will smooth the surface of the strip or sheet but will not extend as deeply into it as does the area of coarse grit.

In the modified form of FIG. 2, a sleeve 4 is shaped to provide outwardly extending ribs 5 which as shown may be of different widths. The sleeve is shaped to provide between the outwardly extending ribs 5, spaces or areas 6 which comprise in effect valleys between the raised portions 5. The sleeve as shown in FIG. 2 is preferably provided with abrasive grit such as tungsten carbide grit and it is applied preferably equally over the entire surface of the sleeve covering preferably the raised portions 5 and the intermediate portions 6.

It would be possible, if desired, to make the sleeve in the form of FIG. 2 by applying grit only to the raised portions 5. In the form shown, when material such as sheets or strips of wood is moved in relation to the sleeve and the latter is rotated, the surface of the material would be treated. It would be grooved where the raised portions 5 contact it and it would be smoothed to a lesser degree when the lower areas 6 contact it. In general, the result of treatment by the sleeve in either the form of FIG. 1 or FIG. 2 will produce the same appearance on the material treated.

As shown in FIG. 3, a sleeve 7 is in position for brazing in an induction brazing furnace. The precise details of the furnace form no part of the present invention.

The sleeve of the present invention may be brazed in almost any type of furnace provided proper heat and proper atmosphere can be maintained in the furnace during brazing. The sleeve of this invention may be suitably made in a variety of furnaces. The induction brazing furnace has the advantage that it can be made of economical use in substantial heights and thus long sleeves may be brazed in it.

In the form of FIG. 3, the furnace is mounted on supports 8 which are I beams and may be of steel and which carry a plate 9. Upon the plate 9 is mounted the actual base 10 of the furnace. The furnace comprises an outer jacket 11 provided at its lower end with a flange 12 by means of which bolts 13 secure it to the plate 9 and to the base 10. An inner surface 14 defines the inner portion of the furnace. Between the sleeve 11 and the surface 14, is a mass of insulation 15 within which are positioned water cooled induction coils 16. The material 15 is refractory and the induction coils are conveniently cast in it. The coils are present in numbers suitable for the required degree of heating and the preferred time interval of heating. Side braces 17 may be provided to give the furnace greater stability.

Adjacent its lower end, there is positioned within the furnace a work locating piece 18. It does not support the sleeve 7 but merely positions or locates it at a proper relationship within the furnace.

Generally the furnace is provided with an inlet 19.

A lid 20 closes, when in position, the upper end of the furnace and is removably fastened in place by latches 21 which are pivoted as at 22 upon the lid and may engage when in the position of FIG. 3 with members 23 secured to the outer face of the furnace sleeve 11. A seal 24 is provided between the lid and the upper end of the insulation or refractory material 15.

The sleeeve may conveniently have an inspection or peep hole opening 25 which is closed by an inspection plate 26. This may be made of clear quartz or other material through which it is possible to look and which will stand the degree of heat present in the furnace during use. 27 is a gas vent.

In the past, sleeves of the type shown, which may be used in abrading or otherwise treating sheet material or used for other purposes, have been supported in a horizontal position during the brazing heat and have shown a pronounced tendency to collapse or distort when in a horizontal position during heating. This has required the use of special fixtures in the sleeve. In the past, these have of necessity been made of special alloys and they have a tendency to "grow" or otherwise distort in use when subjected to the brazing temperatures in excess of 2000° F. A longer heating cycle is required than would otherwise be necessary because of the additional weight of the fixtures which must be heated. The fixtures deteriorate rapidly with repeated heating and go "out of round" and must be frequently replaced. The longer heating cycle due to the presence of the fixtures which in addition to the sleeve must be heated, gives time for the heavy carbide particles to run or slide in the molten copper during brazing.

By the present method of vertical heating, with the sleeve under treatment in a vertical position, no fixtures at all are required to keep the sleeve from collapsing, as would be the case if it were horizontal; hence the cost and trouble of fixtures is avoided. Without the fixtures, the sleeve may be brought to brazing temperature very rapidly and immediately cooled. This limits the time during which the heavy particles of carbide might run or slide downwardly while the copper or other brazing metal is molten.

The method of vertical brazing thus shortens the heating cycle, eliminates the fixtures and work upon them and eliminates the sliding of carbide particles during heating.

Copper has been referred to as the brazing material and it is a satisfactory material. It is applied in powdered form mixed with a material which evaporates and disappears during the brazing cycle and which makes of the copper powder a paste. The tungsten carbide is applied in powdered form and of a suitable degree of fineness and coarseness to produce the ultimately desired article.

Other brazing material than copper may be used, among them is a nickel chromium boron mixture. The invention is not limited to any particular brazing material and those mentioned are merely among the suitable brazing materials available.

Tungsten carbide is a suitable abrasive grit and its use is contemplated in the invention although other hard abrasive grits maye be used if desired.

Generally the furnace is constructed to accomplish rapid heating and cooling. It is important that the furnace itself be susceptible of rapid cooling so that the sleeve or other part under treatment may be cooled very rapidly. To that end, among other features, the furnace has preferably no metal parts. The outer jacket 11 will not normally be made of metal but may be made of fiberglass or some other non-metallic material having the necessary physical properties. Since the furnace is heated by induction, only the sleeve or other part within it will be heated during the carrying out of the process of the invention.

To accomplish proper heating and brazing in the vertical position, it is desirable that the heating itself and the cooling shall both be accomplished with great rapidity and it is advantageous that the sleeve or other part being treated shall be kept at the brazing temperature as short a time as possible. Among the advantages which result in extremely short heating times is the prevention of flowing of the brazing material and movement of the grit. By providing furnace and a method by means of which heating may be carried out with great rapidity and cooling may also be carried out with great rapidity, the flowing and displacement of the brazing material on the grit is prevented. Cooling is accomplished by introducing a suitable atmosphere, preferably through the inlet 19.

Although the invention is not limited to the particular details of any type of furnace, it is preferable to use an induction furnace of the type shown generally herewith and means are provided for introducing gas, air or a controlled atmosphere to the furnace and for withdrawing them from the furnace. Only so much of the means for the introduction and withdrawal from the furnace is illustrated as is necessary to indicate that means are provided. Movement inwardly through the inlet 19 is controlled by a valve which may be automatically or manually operated and which is not shown since the invention is not limited to any particular valve or comparable controlling means. Similarly, movement outwardly through the gas vent 27 is controlled by valve means not shown.

Entrance of gas for a controlled atmosphere into the furnace and outside of the sleeve 7 may be accomplished by the inlet means shown generally in FIG. 3 and in greater detail in the enlarged view of FIG. 4. As shown in those figures, an inlet, pipe or duct 30 leads to a distributing ring 31 positioned within the base 10 and beneath the hollow cavity defined by the furnace. The distributing ring 31 is provided with one or more perforations 32 through which gaseous fluid may flow to the space 33 which is the annular space between the outside of the sleeve 7 and the inside surface 14 of the furnace insulation 15. A sealing means 34 is placed adjacent the distributing ring 31 and lies within a cavity 35 formed at the bottom of the insulation 15. Inward flow through the inlet duct 30 is controlled by a valve which may be operated in any desirable manner and which is not shown as the invention is not limited to any particular type of valve mechanism.

The inlet 19, the inlet 30, and the distributing ring 31 and the gas vent 27 provide together means for introducing gaseous material to the interior of the sleeve or to the exterior of the sleeve and for the discharge of the same gaseous material from the furnace. Thus means are provided for introducing air, gas, atmosphere and any gaseous material which may be desired and for introducing it either within the sleeve or along the outer surface of the sleeve.

The material of which the sleeve or other part which is to be treated is made is ferrous metal or an alloy of a ferrous metal. The grit which is to be bonded to the part may be copper brazed and the grit itself may comprise tungsten carbide. The grit may be of varying degrees of fineness.

Although the heating will be described in detail below in connection with brazing to provide a coating of grit on a sleeve or other base part, the furnace as shown and as described can be utilized for other types of heating such as tempering and annealing. Selected atmospheres may be used in connection with such heatings and it will be pointed out below that selected atmospheres are also used in connection with brazing. If desired, the furnace chamber may be sealed and a vacuum produced by use of a suitable vacuum pump.

In carrying out the brazing treatment, the sleeve is degreased. Cuprous oxide brazing material is applied to it. It may be applied manually or by any desired mechanism. Brushes, rollers, and spraying are among the possible techniques which have been used and which are applicale to the carrying out of the method disclosed herein. After the cuprous oxide has been applied to all the parts of the surface which are to receive tungsten carbide grit, the grits are sprinkled over the surface and this may be done manually and/or by any means which will produce the desired distribution of particles. Generally the surface distribution of the carbide grit particles is such as to produce an even distribution of the particles over the entire surface. The particles will be of a desired degree of fineness. The part thus prepared is put into the furnace in the position indicated in FIG. 3 in a controlled atmosphere and it is heated to a temperature of approximately 2050° F. The heating effect is turned off or discontinued preferably by an automatic switching means as soon as the brazing temperature has been reached and maintained long enough to produce the bonding of the grit to the base material. When the heating effect is discontinued, a neutral gas is introduced into the furnace and the furnace is opened and the gas is effective to assist in cooling the sleeve.

For some purposes where it is desired to have a thick coating of grit, this may require a repetition of the process. A second coating of cuprous oxide is applied and the furnace treatment described above is repeated. This second treatment may be necessary when it is impossible to apply enough cuprous oxide to the sleeve without having the tungsten carbide and the cuprous oxide sag during the furnace cycle. This second application of cuprous oxide provides additional strength between the tungsten carbide particles and the base material or substrate. The process described above may be referred to as the "Soft Bond Process."

Mention has been made of the controlled atmosphere in the furnace in the heating. In most instances, it is desirable to have a reducing atmosphere, in other words, one that will reduce surface oxides. As a higher carbon material is used, an atmosphere having a carbon potential comparable to that of the material should be used. Where the grit is applied to stainless steel, it is preferable, if not actually essential, to use dry hydrogen. There are listed below certain typical analyses of atmospheres which are suitable for use in carrying out the process of this invention:

| | Percent of— | | | | | |
|---|---|---|---|---|---|---|
| | Endo-thermic gas | Exo-thermic gas | Neutral-ene gas | Dry hydrogen | Dissociated ammonia | Dry nitrogen |
| $N_2$ | 47 | 71 | 75 | | 25 | 100 |
| $H_2$ | 34 | 12.5 | 13.2 | 100 | 75 | |
| $CO$ | 19–21 | 10.5 | 11 | | | |
| $CO_2$ | | 5.0 | | | | |
| $CH_4$ | | .5 | .5 | | | |

It is to be understood that the invention is not limited to atmospheres having the particular analyses of any of those above set out. They are typical and satisfactory for various uses and in connection with various materials, but the invention is not limited to any particular atmosphere and the process can be carried out satisfactorily in connection with atmospheres other than those listed.

Whatever the details of the process, and they may be varied as pointed out below, the sleeve to be brazed, after having been prepared by cleaning and degreasing in particular, and after having received a suitable coating of the bonding material and the grit, is placed in the furnace and located centrally as shown in FIG. 3. The furnace is then tightly closed and is purged of air by flushing with a purging gas. Preferably the purging gas enters at one end of the furnace, for example, through the passage 19, and sweeps the furnace and exits at the other end. The purging gases are dry gases, usually nitrogen or argon, and they do not support combustion. Other gases may be used, for example, carbonaceous gases such as methane, ethane, propane, cracked ammonia, hydrogen, exothermic, or endothermic gases, and these do burn. Where a combustible gas is used, a fine screen is placed across the exit to act as a flash arrester.

When the air is expelled from the furnace, the desired atmosphere is established and the inductive power of the induction furnace is applied. The sleeve is thus brought to a brazing temperature to produce a fusing of the bonding materials. When the bonding materials have been brought to the fusing temperature, power is shut off and the part such as the sleeve, or any other desired part, is cooled as rapidly as possible and may be removed from the furnace as soon as it loses its red color and becomes visually black. If the gas is combustible, it will burn at the furnace top when it is purged from the furnace after the door seal is broken open. The gas, if combustible, is ignited by a pilot light suitably placed to cause prompt ignition of the gas upon its exit from the furnace. The copper brazing above described can be carried out in any of the above listed atmospheres. Once the brazing temperature has been reached and held long enough to accomplish brazing, it is preferred to cut off the heating as soon as possible to hold the time of heating thus to a minimum required for brazing. When the heating is cut off, it is preferable as a part of an automatic control whose details form no part of this invention, to introduce the neutral gas to the bottom of the furnace and to assist in cooling the piece which has been brazed.

While the process above described has been referred to as the "Soft Bond" process, the process with some modifications may be applied to or carried out in connection with what is called the "Hard Bond" process, either with fine grit or coarse grit. The substrate material is steel in various sizes and shapes. It is degreased before other treatment to remove oil or grease and to reduce contamination. The brazing material will not suitably adhere to the base material if it has not been cleaned. After degreasing, the surface of the piece which is to be coated is shot-blasted with clean grit shot to provide a rough surface which will create a good mechanical bond between the fine powdered grit and the substrate.

The piece is then preheated, preferably with an oxyacetylene flame, to a temperature from 250–300° F. If the piece under treatment is cylindrical such as the sleeve shown in the drawings, it will be mounted upon a rotating fixture during the heating. The heating is necessary to reduce the shock of the high temperature powder which will presently be sprayed upon the surface under treatment. Thereafter the hard bond material, which is a special tungsten carbide from 200–270 mesh size, is spread by thermo spray gun operated with oxy-acetylene or oxy-hydrogen fuel. The matrix used is a nickel chrome boron blend which produces a hard filler and a suitable base for the carbide particles. As fused, the matrix has a range of R"C" 62–66 and the carbide particles have a range of approximately R"C" 75. The tensile strength of the matrix preferably ranges between 65,200 and 75,000 pounds per square inch. The spray gun by which the matrix is sprayed upon the surface under treatment is preferably held approximately 9 to 14 inches from the surface upon which spraying is taking place. As presently practiced, this method produces a hard bond coat varying from .005 to .025. The thickness varies in accordance with the application of the coating.

After the coating has been applied, the sleeve or other piece is induction heated in a furnace generally of the type shown. To create fusing, heating should be carried out to approximately 2050° F. At this temperature fusion of the coating to the substrate will occur. During heating and fusion, a controlled furnace treatment in an exothermic or other suitable atmosphere is preferred.

A modification of the hard bond process in which coarse grit is used is similar to that above described but varies in some details. If a substrate material comprises low carbon steel in various sizes and shapes, a dull matted finish is preferred. This material is degreased as in the case mentioned above, and after degreasing the surface to be coated is shot-blasted with clean grit shot as in the case above described and heating of the piece under treatment is carried out in the same manner as that above described. The hard bond material which is to be applied in this modification of the hard bond process differs from that described in connection with the example above set out. In this case the hard bond material contains no carbide particles and is a blend of nickel, chrome, and boron. As fused it has a hardness of R"C" 62–66 and a tensile strength range from 65,000 to 75,000 pounds per square inch. This hard bond material is sprayed on the substrate to a thickness of .005 to .025. The thickness of the coating is varied to conform to the size of the tungsten carbide used. Thereafter a coating of suitable flux is applied to the substrate. One suitable flux is that presently available under the name of Handy & Harmon. It provides a base material to which the carbide particles will adhere during the heating treatment. After the flux has been applied, carbide particles are sprinkled onto the flux, sprayed or otherwise applied to it and adhere to it because they are applied while it is still soft and sticky.

After the steps above mentioned, it is necessary to pre-dry the flux before introducing the piece into the furnace. Pre-drying may be suitably accomplished in about four hours at temperatures between 300–400° F. After pre-drying, the piece is heated in an induction furnace of the type shown to a temperature of approximately 2050° F. in a controlled exothermic or other suitable atmosphere. Upon completion of heating, the atmosphere is driven from the furnace and cooling is accomplished. After cooling, the piece is placed in a hot water tank to remove the flux.

The treatments above described carry out the necessary steps to produce a suitable coating of grit, coarse or fine, with a soft bond or hard bond as indicated. The coating carried out upon an elongated piece such as a tube or sleeve without any added fixtures can be accomplished very rapidly. Heating and cooling are accomplished very rapidly so that grit particles do not have time to slip or slide or run along the surface to which they have been applied, and because of the vertical position of the elongated piece to which the coating has been applied, the piece itself will not distort or sag under treatment as would be the case if it were supported in a horizontal position even by means of elaborate fixtures.

I claim:
1. In a method of making an elongated non-distorted thin walled, tubular, abrasive coated steel sleeve the steps of
   applying a brazing metal and a grit material to the exterior surface of an elongated steel sleeve,
   said brazing metal and said grit material being capable of being firmly bonded to said elongated steel sleeve upon the subsequent application of heat thereto,
   said elongated steel sleeve being thin walled,
   positioning said elongated thin walled steel sleeve together with the applied brazing metal and grit material in a vertical position in a furnace heating zone,
   the inner surface of said steel sleeve, and the exterior surface to which said brazing metal and said grit material have been applied, being disposed out of contact with any support means whereby both of said surfaces are exposed to the atmosphere within said heating zone,
   applying induction heat to said vertically positioned steel sleeve,
   said induction heat being applied to the entire surface area of said elongated steel sleeve which carries said brazing metal and said grit material,
   said induction heat being applied rapidly to said thin walled steel sleeve and being terminated prior to any substantial downward slide of said grit material on said steel sleeve while the brazing metal is in a molten condition, and thereafter
   rapidly cooling said coated steel sleeve to fix the grit to said exterior surface of said thin walled steel sleeve.

2. The method of claim 1 further characterized in that said rapid cooling of said tubular member is accomplished by the introduction of a neutral gas into the furnace heating zone.

3. The method of claim 1 further including the step of maintaining a controlled atmosphere in the furnace heating zone,
   said controlled atmosphere being selected from the group consisting of reducing atmospheres and neutral atmospheres.

References Cited
UNITED STATES PATENTS

| | | | |
|---|---|---|---|
| 2,906,612 | 9/1959 | Anthony et al. | 51—309 |
| 2,833,638 | 5/1958 | Owen | 51—309 |
| 2,476,699 | 7/1949 | Cline | 51—309 |
| 2,562,587 | 7/1951 | Swearingen | 51—309 |

DONALD J. ARNOLD, Primary Examiner

U.S. Cl. X.R.

51—293